United States Patent
Thornton et al.

(10) Patent No.: US 10,106,269 B1
(45) Date of Patent: Oct. 23, 2018

(54) SYSTEM AND METHOD FOR INADVERTENT ENGINE SHUTDOWN PREVENTION

(71) Applicant: Rockwell Collins, Inc., Cedar Rapids, IA (US)

(72) Inventors: DeKevin M. Thornton, Petoskey, MI (US); Tapuwa Tavaziva, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/462,734

(22) Filed: Mar. 17, 2017

(51) Int. Cl.
| | |
|---|---|
| *B64D 31/06* | (2006.01) |
| *B64D 31/04* | (2006.01) |
| *B64D 43/00* | (2006.01) |
| *B64D 45/00* | (2006.01) |

(52) U.S. Cl.
CPC .............. *B64D 31/06* (2013.01); *B64D 45/00* (2013.01); *B64D 2045/0085* (2013.01)

(58) Field of Classification Search
CPC ........ B64D 31/06; B64D 31/04; B64D 31/10; B64D 43/00; F02C 6/02; G06G 7/48; G06F 19/00; H02J 9/00; B64C 29/0033; B64C 27/22; G05D 1/0055
See application file for complete search history.

(56) References Cited

U.S. PATENT DOCUMENTS

| | | | |
|---|---|---|---|
| 2002/0091480 A1* | 7/2002 | Greene | F02C 9/42 701/100 |
| 2002/0133322 A1* | 9/2002 | Williams | G09B 9/46 703/8 |
| 2013/0079956 A1* | 3/2013 | Eglin | B64C 27/22 701/3 |
| 2014/0061368 A1* | 3/2014 | Karim | B64C 29/0033 244/12.4 |
| 2015/0176488 A1* | 6/2015 | Borchers | F02C 6/02 60/773 |
| 2015/0333527 A1* | 11/2015 | Rideau | H02J 9/00 307/31 |
| 2016/0137307 A1* | 5/2016 | Fernandez | B64D 31/04 701/3 |
| 2016/0347479 A1* | 12/2016 | O'Neil | B64D 43/00 |
| 2017/0253342 A1* | 9/2017 | De Magalh Es Gomes | B64D 31/10 |

FOREIGN PATENT DOCUMENTS

GB     2132384 A   *  7/1984   ........... G05D 1/0055

* cited by examiner

*Primary Examiner* — Yuri Kan
(74) *Attorney, Agent, or Firm* — Donna P. Suchy; Daniel M. Barbieri (57) ABSTRACT

Systems and methods for controlling a throttle can use an auto throttle system. The auto throttle system includes an auto throttle monitor and a disable processor. The auto throttle monitor is configured to monitor throttle levers for an uncommanded throttle movement and disengage auto throttle control in response to the uncommanded throttle movement. The disable processor is configured to receive an indication of a loss of engine power from a first engine and prevent the auto throttle monitor from disengaging the auto throttle control for a throttle lever of the throttle levers associated with a second engine, the second engine being different than the first engine.

20 Claims, 6 Drawing Sheets

SYSTEM AND METHOD FOR INADVERTENT ENGINE SHUTDOWN PREVENTION

BACKGROUND

A loss of engine power in an aircraft requires quick and precise remediation by the flight crew. Remediation of a loss of engine power requires precise team work and coordination as the flight crew identifies the cause of the loss of engine power and takes the appropriate actions. During a high stress event like a loss of engine power, humans tend to get tunnel vision and can only focus on a limited number of things at a given time. In such situations, the flight crew can sometimes make mistakes, such as inadvertently shutting down a working engine during a loss of engine power event. Inadvertently shutting down a working engine may result in a failure to have enough power to make an emergency landing.

SUMMARY

In one aspect, embodiments of the inventive concepts disclosed herein relate to an auto throttle system. The auto throttle system includes an auto throttle monitor and a disable processor. The auto throttle monitor is configured to monitor throttle levers for an uncommanded throttle movement and disengage auto throttle control in response to the uncommanded throttle movement. The disable processor is configured to receive an indication of a loss of engine power in a first engine and prevent the auto throttle monitor from disengaging the auto throttle control for a throttle lever of the throttle levers associated with a second engine. The second engine is different than the first engine.

In a further aspect, embodiments of the inventive concepts disclosed herein relate a flight control system. The flight control system includes a throttle quadrant including a first throttle lever associated with a first engine, second throttle lever associated with a second engine, a first motor configured to control movement of the first throttle lever, a second motor configured to control movement of the second throttle lever, a first clutch mechanism configured to engage and disengage the first motor to the first throttle lever in response to a first control signal, and a second clutch mechanism configured to engage and disengage the second motor to the second throttle lever in response to a second control signal. The flight control system also includes a processor configured to prevent disengagement of the first motor to the first throttle lever in response to a malfunction of the second engine.

In a still further aspect, embodiments of the inventive concepts disclosed herein relate to a method of preventing inadvertent engine shutdown. The method includes receiving an electronic indication of an engine malfunction of a first engine, and at least partially blocking an ability to reduce power to a second engine. The second engine is a different engine than the first engine.

BRIEF DESCRIPTION OF FIGURES

Exemplary embodiments of the inventive concepts disclosed herein are described with reference to the accompanying drawings, wherein like numerals denote like elements; and.

DETAILED DESCRIPTION

Before describing embodiments of the inventive concepts disclosed herein in detail, it should be observed that the inventive concepts disclosed herein include, but are not limited to, a novel structural combination of components and not in the particular detailed configurations thereof. Accordingly, the structure, methods of manufacture and use, functions, control and arrangement of components have been illustrated in the drawings by readily understandable block representations and schematic drawings, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Systems and methods provide a pilot with a tactile warning and block the pilot from retarding the throttle on a working engine in the event of power loss in some embodiments. The blocking action provides a helping hand action that automatically blocks the pilot from retarding the throttle on the wrong engine in some embodiments, similar to a first officer blocking the throttles during takeoff and other emergency procedures. The helping hand action ensures that the flight crew reduces power on the correct engine. On single pilot airplanes, the helping hand action replaces the first officer's blocking duties and provides crew support when most needed in some embodiments.

In some embodiments, systems and methods are used with turboprop and turbofan airplane engines that are controlled via a full authority digital engine (or electronics) control (FADEC). The FADEC provides very high integrity control for all aspects of the engine performance and engine monitoring. The FADEC detects when an engine has an issue such as a loss of power or an engine fire using sensors. When the FADEC detects loss of power or fire in one engine, systems and methods provides an automatic block on the throttle lever for the good engine, thus providing the flight crew with an indication that they are improperly attempting to reduce power on the good engine. In some embodiments, the block is overcome by a disable or disengage button or by providing more manual force to overcome the initial block of the throttle. In some embodiments, systems and methods are advantageously integrated with existing auto throttle systems.

Figure 1:
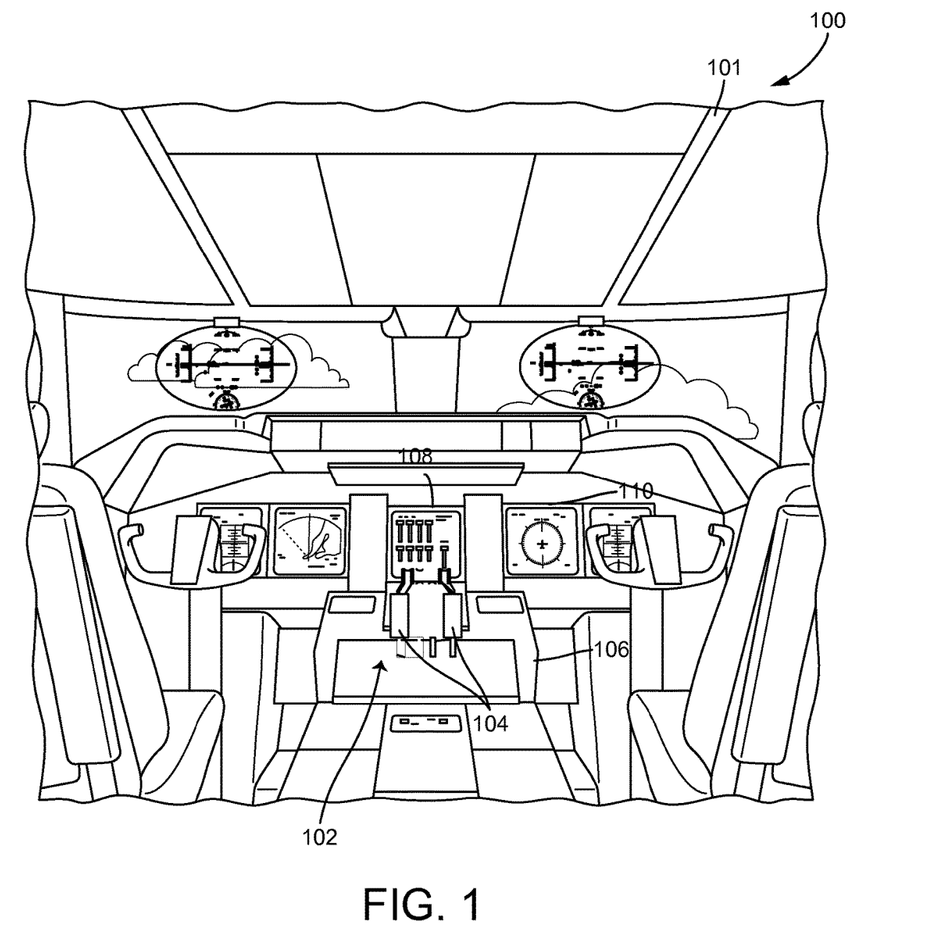
FIG. 1 is a perspective view schematic of an exemplary aircraft control center or cockpit for an aircraft according to some embodiments.

Referring now to FIG. 1, an exemplary aircraft control center 100 for an aircraft 101 is shown. Aircraft control center 100 may include various flight displays used by the aircraft's pilot to increase visual range and enhance pilot's situational awareness and various flight controls including a throttle system 102 including throttle levers 104.

The throttle system 102 and throttle levers 104 are exemplary only; the throttle system 102 and throttle levers 104 can have a variety of orientations and shapes depending upon design criteria and aircraft parameters. The throttle levers 104 are disposed in a throttle quadrant 106.

According to various exemplary embodiments, the throttle system 102 on board the aircraft 101 is configured to perform auto throttle operations and provide helping hand action to prevent a working engine from being improperly retarded or turned off. The throttle system 102 is configured to provide the helping hand action in response to a signal or data associated with the aircraft's engines that indicates that an engine is malfunctioning (e.g., loss of power or engine fire). In some embodiments, the helping hand action prevents the throttle lever 104 associated with a functioning engine from being moved with normal manual force. In some embodiments, information indicating that the helping hand action has been engaged can be provided on a flight display 110.

Figure 2:
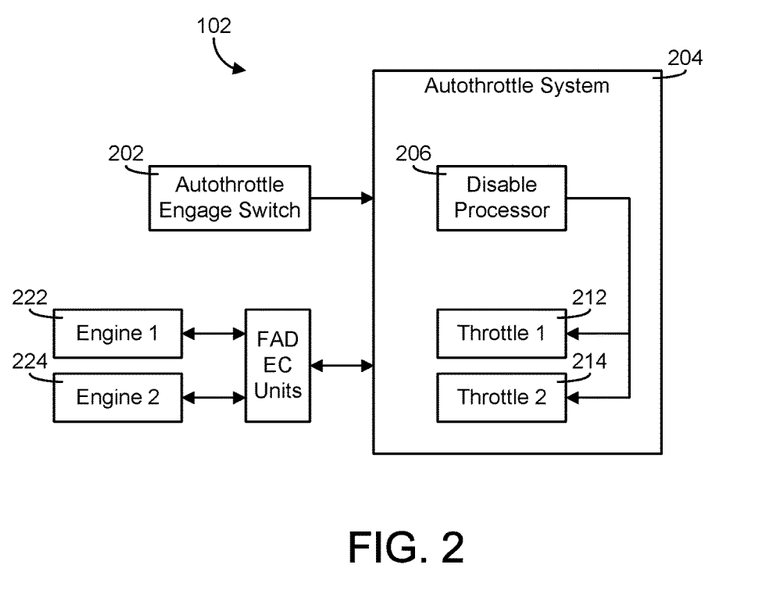
FIG. 2 is a block diagram of an auto throttle system for the aircraft control center illustrated in FIG. 1 according to some embodiments.

With reference to FIG. 2, the throttle system 102 includes an auto throttle engage switch 202 and an auto throttle system 204. The auto throttle engage switch 202 is optional and can be used to engage or disengage the auto throttle system 204. The throttle system 102 is coupled to or in communication with one or more FADECs 208 associated with the aircraft's engines 222 and 224. The FADECs 208 can provide data or a signal indicating that one or more engines is malfunctioning (e.g., an engine fire or loss of power) to the auto throttle system 204. The signal or data is associated with a particular engine that is malfunctioning or includes identifying information of the particular engine that is malfunctioning. The auto throttle system 204 can be part of a flight control panel 108 (FIG. 1) or other user interface.

The auto throttle system 204 includes a disable processor 206 that receives the data or signal from one or more of the FADECs 208 and prevents the appropriate throttle of throttles 212 and 214 from being moved to reduce power. Throttles 212 and 214 include the throttle levers 104 and other mechanisms and electronics for throttle operations. In some embodiments, the disable processor 206 is integrated in the auto throttle system 204 and is configured to prevent inadvertent engine shutdown or provide the helping hand action. The disable processor 206 can be a software module or routine(s) that effect the operations described herein as part of the operation of the auto throttle system 204 in some embodiments. The disable processor 206 becomes active whenever one or more of the FADECs 208 detects an engine problem. In some embodiments, the disable processor 206 provides the helping hand operation for the auto throttle system 204.

The throttle 212 is associated with an engine 222 and the throttle 214 is associated with the engine 224. If the signal or data indicates that the engine 222 is malfunctioning, the disable processor 206 prevents the throttle 214 from being moved to reduce power and allows the throttle 212 to be moved to reduce power. Conversely, if the signal or data indicates that the engine 224 is malfunctioning, the disable processor 206 prevents the throttle 212 from being moved to reduce power and allows the throttle 214 to be moved to reduce power.

In some embodiments, the disable processor 206 effects the helping hand action to assist the flight crew with engine shutdown during emergency engine procedures. The disable processor 206 provides the pilot with an indication that there is an attempt to reduce power on the good or non-malfunctioning engine, instead of the failed or malfunctioning engine. The helping hand action ensures that the good engine continues to provide critical power for flight during an emergency phase of flight where engine retardation could result in catastrophic consequences.

The FADECs 208 can be coupled to the auto throttle system 204 via a central controller, a master FADEC or a communication unit/hub. Various mechanisms and electronics can be used to prevent movement of the appropriate throttle 212 and 214. Although only two throttles 212 and 214 and two engines 222 and 224 are shown, the auto throttle system 204 can be used with any number of engines 222 and 224 and throttles 212 and 214.

Figure 3:
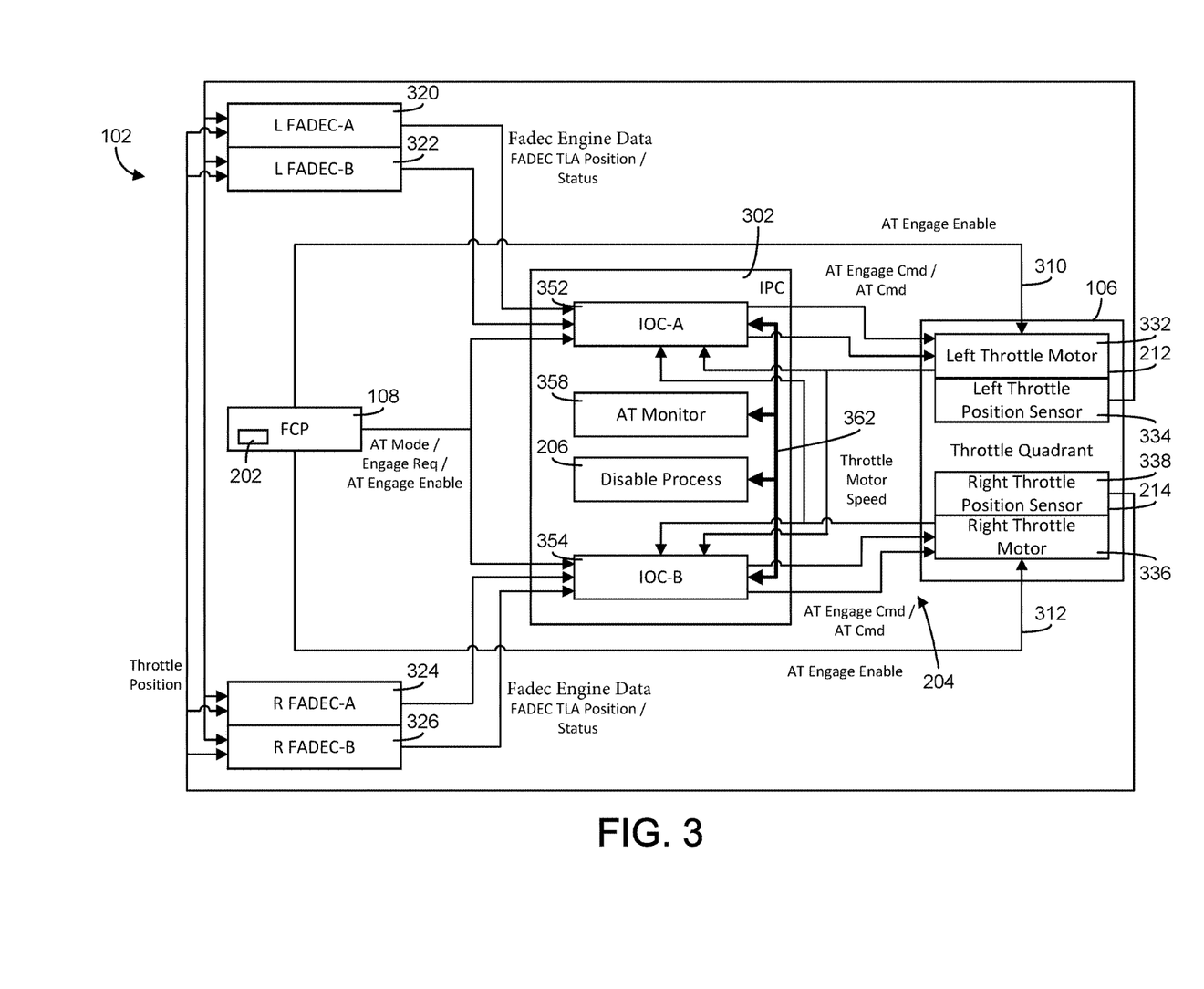
FIG. 3 is a more detailed block diagram of the auto throttle system for the aircraft control center illustrated in FIG. 2 according to some embodiments

With reference to FIG. 3, the throttle system 102 includes the auto throttle system 204 including an integrated processing center 302 and the throttle quadrant 106. The integrated processing center 302 is coupled to the throttle quadrant 106 for communication of data or signals for commanded throttle positions and actual throttle positions. The auto throttle engage switch 202 on the flight control panel 108 is coupled to the throttle quadrant and the integrated processing center to communicate auto throttle mode engage and disengage data or signals for engaging and disengaging auto throttle operations.

Flight control panel 108 is coupled to throttle quadrant 104 at an input 310 and an input 312 to provide a signal to engage and disengage the auto throttle operations in some embodiments. The integrated processing center 302 is coupled to a left engine FADEC channel A 320, a left engine FADEC channel B 322, a right engine FADEC channel A 324 and a right engine FADEC channel B 326. Each of left FADEC channel A 320, left engine FADEC channel B 322, right engine FADEC channel A 324 and right FADEC channel B 326 is coupled to the integrated processing center 302 for providing engine data or signals to and from the FADECs 208 (FIG. 2). The engine information includes engine malfunction data or signals that indicates whether an engine 222 or 224 (FIG. 2) is malfunctioning (e.g., loss of power or fire) and the identity of that engine 222 or 224 the identity of the throttle associated with that engine 222 or 224. The engine information includes thrust level angle (TLA) position and status information.

Each of left FADEC channel A 320, left engine FADEC channel B 322, right engine FADEC channel A 324 and right FADEC channel B 326 is coupled to the throttle quadrant 106 for providing engine or throttle data or signals to and from the FADECs 208 (FIG. 2). The throttle data or signals includes throttle position. The FADECS can provide an indication of which of left FADEC channel A 320, or left engine FADEC channel B 322 channel and which of the right engine FADEC channel A 324 or right FADEC channel B 326 is the master for its users.

The throttle quadrant 106 includes a left throttle motor 332, a left throttle position sensor 334, a right throttle motor 336 and a right throttle position sensor 338. The left throttle motor 332 and the right throttle motor 336 respectively control the left throttle (one of throttle levers 104) associated with the left throttle motor 332 and the right throttle associated with the right throttle motor 336 in response to an auto throttle command provided by the integrated processing center 302. The left throttle position sensor 334 and the right throttle position sensor 338 respectfully determine the position of the respective left throttle and right throttle and provide the position to the left engine FADEC channel A 320, the left engine FADEC channel B 322, the right engine FADEC channel A 324 and the right engine FADEC channel B 326. The left throttle position sensor 334 and the right throttle position sensor 336 can be any electronic, optical or mechanical sensor for sensing throttle position. The left throttle motor 322 and right throttle motor 336 can be any electro-mechanical device for moving throttles to particular positions.

The integrated processing center 302 includes a left throttle input/output (I/O) interface 352, a right throttle I/O interface 354, an auto throttle monitor 358, and the disable processor 206. The left throttle I/O interface 352 and the right throttle I/O interface 354 receives FADEC TLA position and status information from the left engine FADEC channel A 320, the left engine FADEC channel B 322 and the right engine FADEC channel A 324 and the right engine FADEC channel B 326, respectively. In some embodiments, left FADEC channel A 320 and left engine FADEC channel B 322 are redundant channels and the right engine FADEC channel A 324 and the right FADEC channel B 326 are redundant channels. The left engine FADEC channel A 320, the left engine FADEC channel B 322, the right engine FADEC channel A 324, and the right engine FADEC channel B 326 each receive throttle position data or signals for the right throttle form the right throttle position sensor 338 and for the left throttle from the left throttle position sensor 334.

The left throttle I/O interface 352, the right throttle I/O interface 354, the auto throttle monitor 358, and the disable processor 206 are connected to each other via an Ethernet bus 362 in some embodiments. The integrated processing center 302 provides auto throttle operations in response to the auto throttle engage signal from the switch 202 determines the appropriate left and right throttle positions and provides the appropriate auto throttle command via the left throttle I/O interface 352 and the right throttle I/O interface 354 to the throttle quadrant 106. The position of the left and right throttles is set by the respective left throttle motor 332 and the right throttle motor 336 in response to the auto throttle command. The positions of the left and right throttles are sensed by the left throttle position sensor 334 and right throttle position sensor 338 through input/output control channel A 352 and input/output control B 354 for reception by integrated processing center (e.g., by the auto throttle monitor 358 and the disable processor 206).

The FADECs 208 interface directly with the left throttle I/O interface 352 and the right throttle I/O interface 354 for commanding auto throttle movements. An auto throttle application, module or routine residing in the integrated processing center 302 provides the auto throttle commands in response to the information form the FADECS 208 as well as other flight control information in some embodiments. The auto throttle application only uses the master FADEC data to control the engine thrust via the auto throttle command in some embodiments.

When the auto throttle engage switch 202 on the flight control panel 108 is depressed, the flight control panel 108 provides an auto throttle engage enable discrete signal to both the right throttle motor 336 and the left throttle motor 332 which are 28 Volt direct current (VDC) servos in some embodiments. The auto throttle engage enable discrete signal is also provided to the left throttle I/O interface 352 and the right throttle I/O interface 354 as an ARINC 429 discrete auto throttle engage enable bit in some embodiments.

When the auto throttle application detects the discrete auto throttle engage enable bit from the flight control panel 108, the auto throttle application issues the auto throttle engage command and the auto throttle command (e.g., the position command) to the both the right throttle motor 336 and the left throttle motor 332. The auto throttle command controls the engine thrust by commanding the throttles to move in the desired direction. During normal operation, when the throttles are moved manually by a pilot, the auto throttle monitor 358 disengages the auto throttle operation. The auto throttle monitor 358 determines that the throttles are being moved manually by sensing that the throttles are at a position using signals from the left and right throttle position sensors 334 and 338 and comparing the actual positions to the expected position. In some embodiments, the auto throttle monitor 358 uses rate of movement of the levers, or position change to detect a pilot override of the auto throttle. In some embodiments, an uncommanded throttle movement (e.g., the pilot moving the levers) is indicative of a pilot override. In other words, the movement of the levers was not commanded by the auto throttle application. In some embodiments, an uncommanded throttle lever movement because of a failure of the throttle system 102 would cause a disengagement of the auto throttle system 204 and the helping hand operation would be disabled when there is system failure in the throttle system 102.

When the integrated processing center 302 (e.g., the auto throttle monitor 358 or disable processor 206) receives a signal or data from the left engine FADEC channel A 320, left engine FADEC channel B 322, the right engine FADEC channel A 324 or the right engine FADEC channel B 326 that an engine is malfunctioning, the disable processor 206 provides a signal to the appropriate left throttle motor 332 or right throttle motor 336 such that the non-malfunctioning engine is prevented from having its throttle moved if the auto throttle mode is engaged. The amount of force provided by the throttle motor 332 and 336 can be overcome by manual action so that a pilot can override the auto throttle commands from the integrated processing center 302.

In some embodiments, when a FADEC or FADECS 208 detects an abrupt and significant loss of engine power, a status bit is provided to the integrated processing center 302. The auto throttle application decodes the status bit signifying the loss of engine power and uses the disable processor 206 to ignore the pilot's manual override of auto throttle control of the good engine (e.g., the engine producing power) if the flight crew attempts to retard the throttle. If the auto throttle mode is not engaged at the time of the loss of engine power, the integrated processing center 302 automatically engages the auto throttle mode. However, if the auto throttle mode is not engaged at the time of the loss of engine power during the critical part of takeoff (e.g., from 60 knots through 400 feet above ground level (AGL)) and if the flight crew attempts to retard the throttle, the auto throttle application ignores the auto throttle override of the auto throttle disconnect on the good engine. The auto throttle application can employ logic to limit the use of the helping hand operation during certain predefined phases of flight. As an example, during the take-off run when the crew might want to abort the take-off the employment of the helping hand operation is limited or prevented. Other parameters can be used to determine when the helping hand operation should become inactive or be disabled in accordance with competing higher priority safety or operational considerations/requirements in some embodiments.

The integrated processing center 302 can include one or more circuits in communication and configured to process received data and to output data based on the processed data. The integrated processing center 302 may receive data from, or provide data to, any number of the aircraft's electronic devices. The integrated processing center 302 may be in communication with onboard systems configured to generate data regarding the aircraft and its surroundings. The integrated processing center 302 can be or include, one or more microprocessors, application specific integrated circuits (ASICs), circuits containing one or more processing components, a group of distributed processing components, circuitry for supporting a microprocessor, or other hardware configured for processing. According to an exemplary embodiment, the processor is configured to execute computer code stored in memory to complete and facilitate the operations of auto throttle monitor 358. The disable processor 206 and the auto throttle application. The memory is any volatile or non-volatile computer-readable storage medium capable of storing data or computer code relating to the activities described herein.

Figure 4:
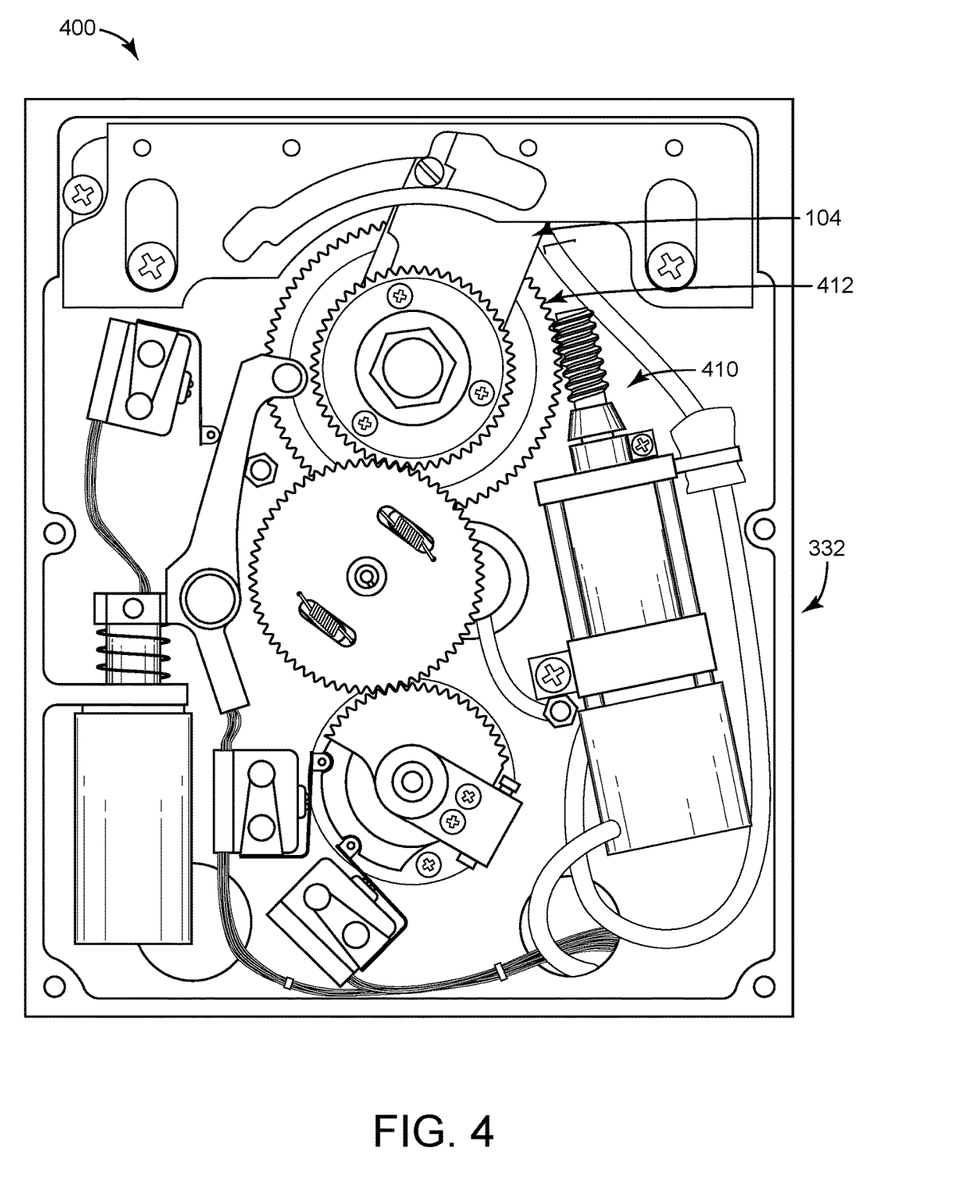
FIG. 4 is a top view schematic drawing of some of the mechanical and lector mechanical components of the auto throttle system illustrated in FIG. 2.

With reference to FIG. 4, an electromechanical system 400 can be utilized as part of the throttle system 102. Two electromechanical systems 400 are included in the throttle system 102 (FIG. 3); one electromechanical system 400 for the left throttle and the right throttle in some embodiments. For example, the left throttle motor 332 is located in the electromechanical throttle system 500 as an auto throttle engage servo capstan 410. The auto throttle engage servo capstan 410 is shown in FIG. 4 with a clutch in an engaged position according to some embodiments. When the auto throttle application detects the discrete auto throttle engage enable signal from the flight control panel 108, the auto throttle application issues the auto throttle engage command to the auto throttle engage servo capstan 410 which engages a gear mechanism 412 to position the throttle lever 104. The auto throttle engage servo capstan 410 ties the motor 332 to the gear mechanism 412 to move the throttle levers as specified and controlled in the auto throttle command. Each throttle lever has an associated auto throttle servo and gear mechanism similar to auto throttle engage servo capstan 410 and gear mechanism 412 in some embodiments.

The signals from the throttle position sensors 334 and 336 are monitored by the auto throttle monitor 358 for throttle movement. The position sensors 224 or 336 (FIG. 3) can be inductive sensors, photo sensors, mechanical sensors, etc. If the auto throttle monitor 358 detects uncommanded throttle movement, the auto throttle engage servo capstan 410 is disengaged from the gear mechanism 412 and control of the throttles is returned to the flight crew. The auto throttle monitor 358 detects uncommanded throttle movement by comparing actual throttle positions as sensed by the position sensors 224 or 336 (FIG. 3) to the commanded position in some embodiments.

Figure 5:
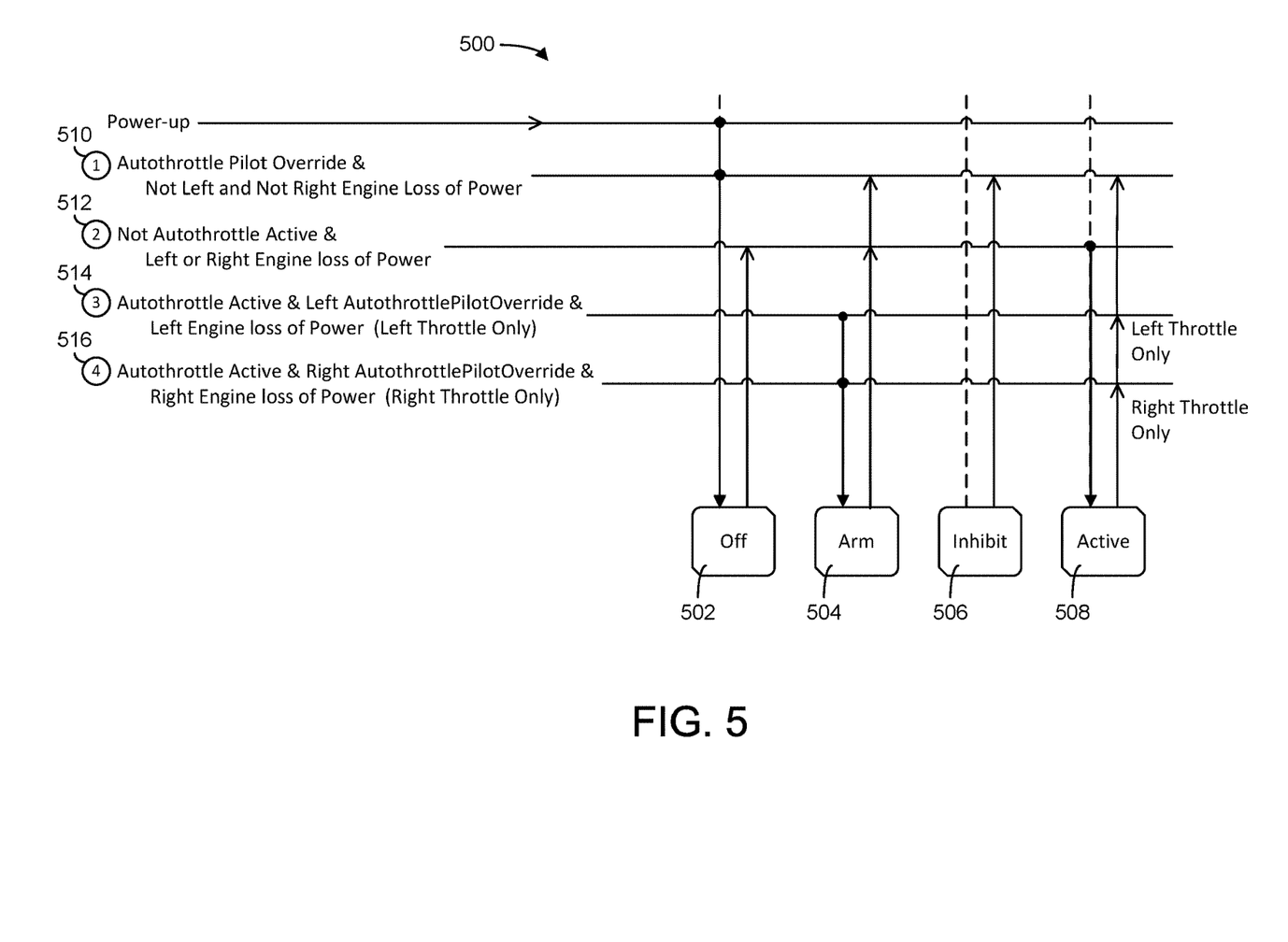
FIG. 5 is a state diagram for the auto throttle system illustrated in FIG. 2 according to some embodiments.

With reference to FIG. 5, a state diagram 500 can be used by the auto throttle system 204 (FIG. 2). The auto throttle system 204 can operate in an off state 502, an on state 504, an inhibit state 506, and an active state 508. Upon power up, the auto throttle system 204 is in the off state 502. In the off state 502, the auto throttle system is not engaged and the pilot manipulates the throttles manually. The off state 502 allows the pilot free control of the throttles without any additional resistance from the auto throttle servos (e.g., motors 332 and 336) or the auto throttle system 204. If the auto throttle system 204 is disengaged via the auto throttle engage switch 202, the inhibit state 506 is reached and the off state 502 is reached.

If the pilot overrides the auto throttle system 204 by manually moving the throttle, and if there is not a malfunction of an engine being reported according to a sequence 510, the auto throttle system 204 enters the off state 502 from any of the on state 504, the inhibit state 506, and the active state 508. The auto throttle system 204 remains in the off state 502 until the auto throttle system 204 is engaged or there is a loss of power event, and the auto throttle system 204 enters the active state 508. For example, the auto throttle system 204 enters the active state 508 from the off state 502 according to a sequence 512 in which the auto throttle system 204 is in the off state and a loss of power is detected.

In the active state 508, the auto throttle system 204 controls the placement of the throttles. In the active state 508, if a pilot override is applied and there is not an engine malfunction, the auto throttle system 204 enters the off state 502 according to the sequence 510. If there is a left auto throttle pilot override and the left engine has lost its power, the left throttle will be allowed to be moved in the arm state 404 according to the sequence 514. If there is a left auto throttle pilot override and the left engine has lost its power, the left throttle will be allowed to be moved in the arm state 504 according to the sequence 516. If a right throttle pilot override is applied with a left engine loss of power, only the left throttle is allowed to be moved in the inhibit state 506. If a left throttle pilot override is applied with a right engine loss of power, only the right throttle is allowed to be moved in the arm state 504. If the auto throttle system 204 is in the active state 508 and the right auto throttle pilot override is applied and the right engine loss of power occurs, the arm state 404 is reached and the right throttle is prevented from moving. If in the active state 508 and the left auto throttle pilot override is applied and the right engine has lost power, the arm state 504 is reached and the right throttle is prevented from moving. The arm state 504 is left in response to the auto throttle no longer being active or there being no engine malfunction.

According to the state diagram 500 and some embodiments, when the flight crew initiates the emergency procedures, they will retard the throttle on the failed engine. The auto throttle system 204 detects the pilot override on the failed engine and disengages the auto throttle engage servo capstan 410 (FIG. 4), allowing the pilot to reduce power. If the pilot mistakenly tries to reduce power on the engine still producing power (good engine), the auto throttle system 204 ignores the pilot override for that engine and the auto throttle servo remain engaged in the armed state 504 according to the sequences 514 and 516. By ignoring the pilot override and remaining engaged, the throttle lever 104 for the good engine will be difficult to move, providing the pilot with an indication that he or she is trying to reduce power on the wrong engine.

Figure 6:
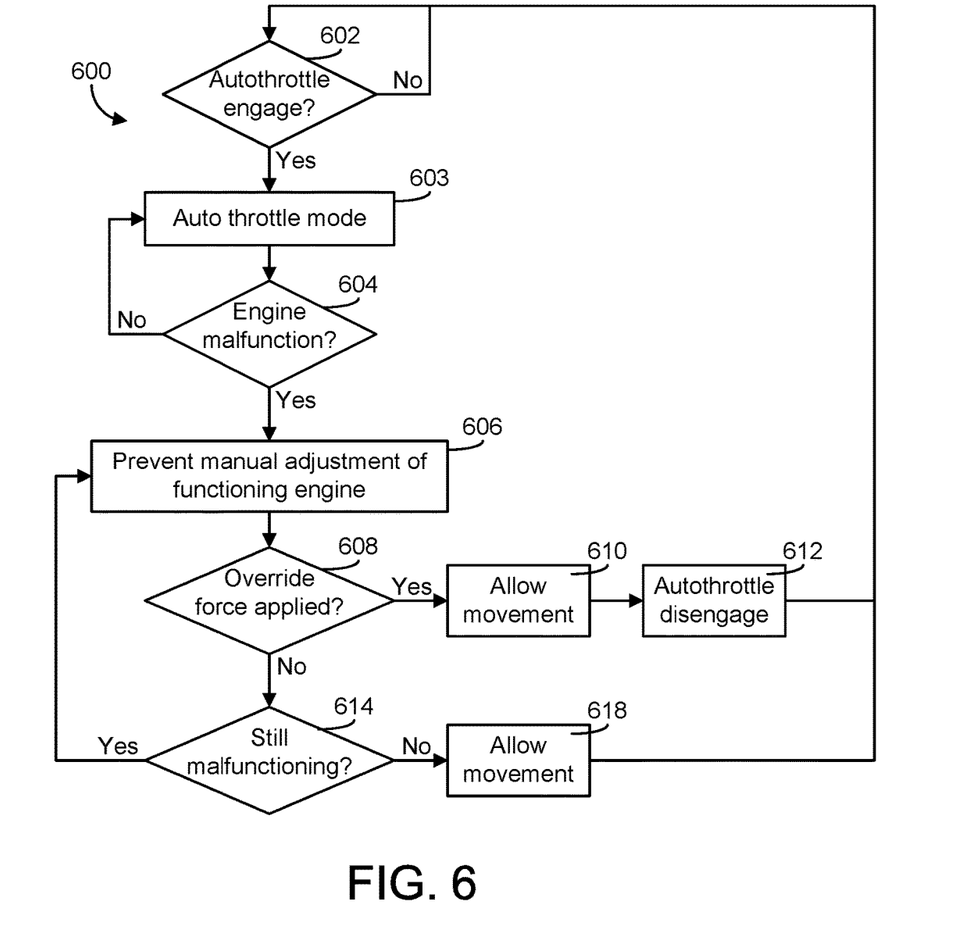
FIG. 6 is a flow diagram for the auto throttle system illustrated in FIG. 2 according to some embodiments.

With reference to FIG. 6, the auto throttle system 204 determines if the auto throttle mode is engaged in a step 602. If not, the auto throttle system 204 remains at the step 602; if so, the auto throttle system 204 enters the auto throttle mode in a step 603.

The auto throttle system 204 determines if an engine malfunction has occurred via signals or data from FADECS 208 or other aircraft systems in a step 604. If an engine malfunction has occurred, the auto throttle system 204 advances to a step 606. If an engine malfunction has not occurred, the auto throttle system 204 returns to the step 603 until the auto throttle system 204 is disengaged.

At the step 606, the auto throttle system 204 prevents manual adjustment of the throttle for the functioning engine or engines. At a step 608, the auto throttle system 204 determines if manipulation of the throttle is above the override force. If so, the movement of the throttle is allowed in a step 610 and the auto throttle system 204 is disengaged in a step 612. If the override force is not applied, the auto throttle system 204 determines if the malfunction still remains. If so, adjustment of the throttle associated with the previously malfunctioning engine is allowed in a step 618 and flow 600 returns to the step 604. If the malfunction is still occurring, flow 600 returns to step 606.

In some embodiments, the auto throttle system 204 is configured so that the pilot remains in complete control of the auto throttle system 204 and the helping hand action is a gentle reminder that the pilot may be attempting an action that he or she may really not want to do. To ensure complete control, the pilot is able to move the throttle by either back driving the auto throttle engage servo capstan 410 or by disconnecting the auto throttle system 204 via the auto throttle engage switch 202 (FIG. 2). In some embodiments, the helping hand action is active for a predetermined amount of time after the power loss (e.g., 2, 5, or 10 seconds). In some embodiments, the auto throttle system 204 does not alter the throttle position or change thrust setting during the predetermined amount of time.

In some embodiments, the auto throttle system 204 is configured so that its operation during all phases of flight remain unaffected, except during emergency engine out or loss of power.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which could be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A method of preventing inadvertent engine shutdown, the method comprising:
   receiving an electronic indication of an engine malfunction of a first engine; and
   blocking an ability to reduce power to a second engine by manually moving a throttle lever for the second engine, the second engine being a different engine than the first engine, wherein the blocking comprises preventing the throttle lever from being moved to reduce power until an overcome force is applied, the overcome force being a manual force applied to the throttle lever above a normal throttle manual force threshold.

2. The method of claim 1, further comprising:
   allowing the power to be reduced to the second engine in response the overcome force.

3. The method of claim 2, wherein a clutch allows the power to be reduced to the second engine in response to the overcome force.

4. The method of claim 3, wherein the blocking is performed using an auto throttle system.

5. The method of claim 4, wherein the auto throttle system comprises a disable processor configured to respond to the electronic indication and block the ability to reduce the power to the second engine.

6. The method of claim 4, further comprising:
   allowing power to be reduced to the second engine as the throttle lever for the second engine is moved in response to the overcome force.

7. The method of claim 1, wherein the indication is from a full authority digital electronic control (FADEC).

8. The method of claim 1, wherein an auto throttle system sets a throttle position for the first and second engine using an electric motor.

9. An auto throttle system, comprising:
   an auto throttle monitor configured to monitor throttle levers for an uncommanded throttle movement and disengage auto throttle control in response to the uncommanded throttle movement; and
   a disable processor configured to receive an indication of a loss of engine power in a first engine and prevent the auto throttle monitor from disengaging the auto throttle control for a throttle lever of the throttle levers associated with a second engine in response to a manual force on the throttle lever to reduce power, the second engine being different than the first engine.

10. The auto throttle system of claim 9, wherein the second engine is a non-malfunctioning engine.

11. The auto throttle system of claim 9, further comprising:
    an auto throttle clutch mechanism configured to engage and disengage the auto throttle control in response to a control signal from the auto throttle monitor.

12. The method of claim 1, wherein the blocking step is prevented from occurring during a critical part of takeoff if an auto throttle mode is not engaged.

13. The auto throttle system of claim 11, further comprising:
    a user interface for engaging the auto throttle control.

14. The auto throttle system of claim 9, wherein the indication is provided on a master channel of a full authority digital electronic control (FADEC).

15. The auto throttle system of claim 9, wherein the auto throttle control is automatically engaged in response to the indication.

16. The auto throttle system of claim 9, wherein the disable processor is configured to prevent the auto throttle monitor from disengaging the auto throttle control for a predetermined amount of time.

17. The auto throttle system of claim 9, wherein the auto throttle control is automatically disengaged in response to a signal from a user interface.

18. A flight control system, comprising:
    a throttle quadrant comprised of a first throttle lever associated with a first engine, a second throttle lever associated with a second engine, a first motor configured to control movement of the first throttle lever, a second motor configured to control movement of the second throttle lever, a first clutch mechanism configured to engage and disengage the first motor to the first throttle lever in response to a first control signal, and a second clutch mechanism configured to engage and disengage the second motor to the second throttle lever in response to a second control signal; and
    a processor configured to prevent disengagement of the first motor to the first throttle lever in response to a malfunction of the second engine.

19. The flight control system of claim 18, wherein the first clutch mechanism is configured to allow the disengagement when a manual force above a threshold is applied to the first throttle lever.

20. The flight control system of claim 18, wherein the throttle quadrant is comprised of a first position sensor associated with the first throttle lever and a second position sensor associated with the second throttle lever and wherein the processor is configured to monitor the first throttle lever for an uncommanded throttle movement and disengage the first motor from the first throttle lever in response to the uncommanded throttle movement by monitoring a first position signal from the first position sensor when the malfunction of the second engine is not present.

* * * * *